April 3, 1962 J. M. BROWNLOW ETAL 3,028,337

METHOD OF PREPARING FERRITE CORES

Filed Oct. 15, 1957

INVENTORS
JAMES M. BROWNLOW
BARLANE R. EICHBAUM
BY
William J. Schelberg
AGENT 3,028,337
METHOD OF PREPARING FERRITE CORES James M. Brownlow, Fishkill, and Barlane R. Eichbaum, Poughkeepsie, N.Y., assignors to International Business Machines Corporation, New York, N.Y., a corporation of New York Filed Oct. 15, 1957, Ser. No. 690,303
4 Claims. (Cl. 252—62.5)

This invention relates to an improved method of preparing ferrite cores. More particularly, it relates to a method of preparing ferrite cores which exhibit more desirable magnetic characteristics.

In certain applications of magnetic cores in computer type circuits, it is desired to use ferrites having a low coercive force and fast switching speed. Zinc-manganese-iron and cadmium-manganese-iron ferrites, for example, within a certain composition range, display these desired magnetic characteristics. However, under conventional firing conditions, for example, sintering at 1000°–1500° C. in an open boat, zinc and cadmium metal volatilize from the green ferrite cores.

It is the purpose of this invention to describe an improvement in the existing method of preparation of ferrospinels containing volatile metal constitutents, such as zinc and cadmium.

In the conventional method of preparation of ferrospinels the oxide powders are compacted into a desired shape and sintered at elevated temperatures in a controlled atmosphere. When no reducible metal oxide is present in the system, the loss of any metallic component is usually negligible. However, in a system containing $Zn^{2+}$ and $Fe^{2+}$ ions, for example, there is an opportunity at the sintering temperatures (1000–1500° C.) for reduction of $Zn^{2+}$ to zinc metal to occur with the resultant loss of zinc metal (B.P. 907° C.).

Table I shows the variation in zinc oxide content of zinc containing ferrites of the formula $$Fe_{1.5}Mn_{0.6}Zn_{0.6}Mg_{0.3}O_4$$

(ZnO 21.5 mol percent) after firing in an open platinum boat in air at various temperatures and for various times.

*Table I*

| Temp. (° C.) | Time (hrs.) | Curie Temp. (° C.) | Magnetic Moment (at −196° C.) (Gauss) | ZnO Mol (Percent) |
|---|---|---|---|---|
| 1,250 | 1 | 4 | 7,050 | 19.5 |
| 1,440 | 1 | 49 | 5,624 | 16.7 |
| 1,440 | 16 | 159 | 5,162 | 8.9 |

The data indicates that the variations in magnetic properties of these ferrites can be partially explained on the basis of changes in the gross chemical composition due to the preferential loss of zinc during sintering. A complete understanding of these effects is achieved, however, by a consideration of the observed gradient in zinc concentration and the associated gradient in magnetic properties near the ferrite sample surfaces. When the sample surfaces are removed, they are found to have a lower zinc content and a higher Curie temperature than the interior material. In Table II we see a comparison of the Curie temperatures of the inner material and the surface material of a ferrite of the composition $$Fe_{1.5}Mn_{0.6}Zn_{0.6}Mg_{0.3}O_4$$

which was prepared by heating at 1250° C. for 24 hours (sample 1) with those of the same material heated at the same temperature and for the same time under conditions which suppress the volatilization of zinc (sample 2).

*Table II*

| Sample: | Curie temperature (°C.) |
|---|---|
| (1) Inner material | 46 |
| (1) Surface material | 78 |
| (2) Entire sample | 4 |

The observed concentration gradient implies that at the sintering temperatures the bulk diffusion rate of zinc is lower than the rate of volatilization. It is found that a lower temperature anneal (800°–1000° C.) reduces the concentration gradient but does not eliminate it.

It is accordingly desired to devise a new method of making ferrospinels especially those of the square or rectangular hysteresis loop type which are suitable in application as memory cores in computer circuitry containing metal oxides, such as zinc oxide and cadmium oxide, which are capable of being reduced at the sintering temperatures by $Fe^{2+}$ to give low boiling metals. The method should prevent the volatilization of these constituents and enable the production of ferrites having a chemically homogeneous distribution of ferrospinel magnetic material.

A possible solution to the problem is to enclose the reactants in a completely sealed system of small volume, such as a bomb, which can withstand the pressure caused by the vaporizing metal constituent. When such a system is cooled down very slowly, equilibrium is attained within the system and a relatively homogeneous product is obtained. However, in the preparation of many ferrite cores, where a large kiln is used, this experimental procedure is not at all convenient.

An object of this invention is, therefore, to prevent the loss of metallic constituents of ferrospinels during the sintering process.

Another object of this invention is to produce ferrites which have a homogeneous distribution of magnetic material.

Still another object is to prepare ferrospinels by a simplified sintering process.

Among the other objects of this invention is to produce ferrites having more desirable magnetic characteristics.

The present invention describes a method of preparation of ferrospinels containing zinc oxide or cadmium oxide which considerably improves their magnetic characteristics. According to the practice of this invention, the compacted ferrite powders, or presintered cores, which are prepared by well known techniques, are contained in a suitable sintering receptacle, such as a platinum boat described in a copending application, Ser. No. 560,609, now U.S. Patent No. 2,842,500 filed by John W. Gibson and Kenneth A. Lundberg and assigned to the same assignee as this invention.

A separate quantity of the same ferrite powders is then added to the receptacle. When, however, a large number of the presintered cores are contained in a receptacle of small volume, no additional ferrite powders are required. The boat is provided with a cover, generally of the same material as the receptacle, and fitted so as to keep excessive air currents out of the boat. The presintered cores are then subjected to the optimum sintering cycle. Usually this involves heating the ferrite to 1000–1500° C. for 15 minutes to 3 hours but the conditions, of course, will depend upon the particular ferrospinel being prepared.

Other objects of the invention will be pointed out in the following description and claims and illustrated in the accompanying drawings, which disclose, by way of example, the principle of the invention and the best mode, which has been contemplated, of applying that principle.

Figure 1:
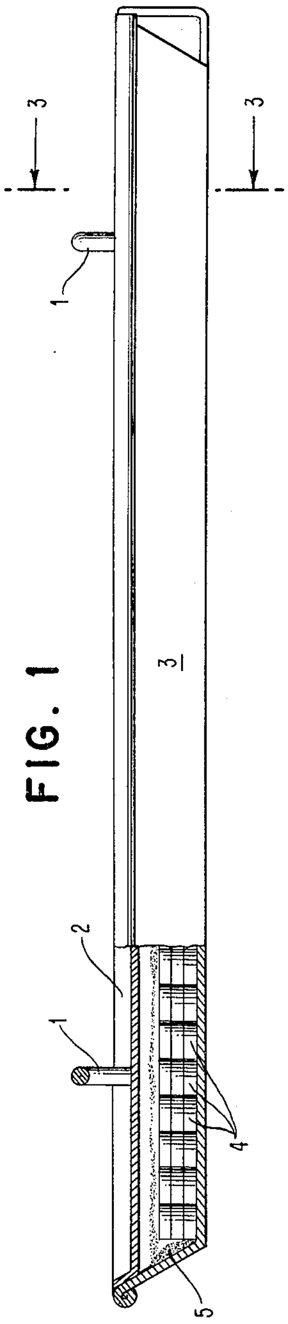
FIG. 1 is a side elevation of the assembly with a portion of the side wall removed.
Figure 2:
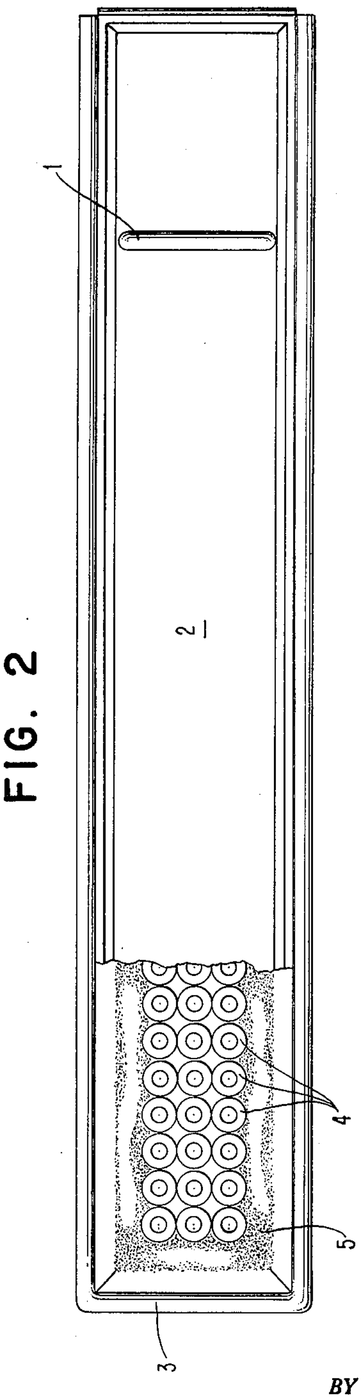
FIG. 2 is a plan view of the assembly with a portion of the cover removed.
Figure 3:
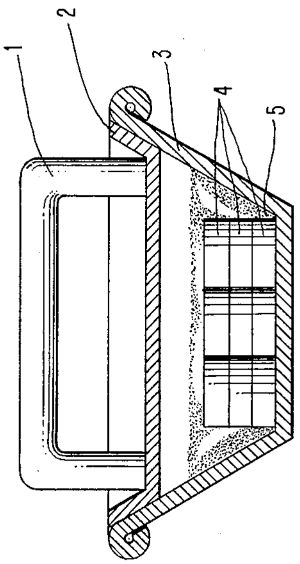
FIG. 3 is an enlarged section along the lines 3—3 in FIG. 1.

The ferrite powder 5 within the boat 3 will be available, if necessary, to supply additional zinc vapor to the atmosphere above the cores 4. The loose fitting cover 2 will permit passage of the gaseous atmosphere of the kiln but will effectively prevent large currents of this atmosphere from sweeping out metal vapor. The handle 1 readily allows removal and positioning of the cover 2.

The following examples as presented to illustrate the practice of our invention. The following definitions may prove helpful.

The discrimination ratio may be defined as the ratio of the voltage output obtained when a magnetic core is read out from the undisturbed "1" remanence state to the voltage output obtained when a positive half select pulse is applied to the core in the undisturbed "0" remanence state.

The *Br/Bs* ratio is the ratio of the magnetic flux in the core at the remanence state to the magnetic flux at saturation; it was measured using 1 ampere pulses.

The coercive force, Hc, may be defined as that applied magnetizing force which is necessary to switch the core from one remanence state to another. These magnetic characteristics indicate the usefulness of a ferrite material as a storage element.

EXAMPLE I

Using the articles described above a large number of ferrite cores were prepared having improved magnetic characteristics over those obtained by other sintering methods. Table II shows a comparison of the magnetic properties of ferrites prepared by two methods. In method 1 the ferrite powder was sintered at 1440° C. for 1 hour in air in an open platinum boat. In method 2 the ferrite powders were sintered at 1440° C. for 1 hour in air in the receptacle and cover as shown in the figure. The composition of the ferrite mixture was $Zn_{0.3}Mn_{0.7}Fe_2O_4$ ($15ZnO, 35MnO, 50Fe_2O_3$ mol percent).

*Table III*

| Firing Method | Curie Temp. (° C.) | Magnetic Moment (at −196° C.) | Hc (oe.) | *Br/Bs* |
|---|---|---|---|---|
| 1 | 205 | 8,440 | 0.32 | 0.62 |
| 2 | 185 | 8,970 | 0.26 | 0.80 |

The data demonstrates that the sintering technique of the present invention gives much improved squareness to the hysteresis loop, lower coercive force and a lower Curie temperature.

EXAMPLE II

Table IV shows a comparison of several methods in the cadmium-manganese-iron system. Method 1 consisted of firing at 1110° C. for 15 minutes in air, furnace cooling to 930° C. during a period of 10 minutes and quenching to room temperature. Method 2 consisting of firing at 1200° C. for 30 minutes in air, furnace cooling to 950° C. during a 10 minute interval and thereafter quenching to room temperature. Method 3 was identical as method 1 or 2 as the case may be except that the green ferrite cores were enclosed in the covered receptacle as described. The switching times, T*s*, were obtained using drive current pulses of 1 ampere.

*Table IV*

| Firing Method | Mixture Composition, Mol Percent | | | Switching Time, Ts (μ sec.) | Hc (oe.) | One to Zero Ratio | *Br/Bs* |
|---|---|---|---|---|---|---|---|
| | CdO | MnO | $Fe_2O_3$ | | | | |
| 1 | 20 | 45 | 35 | 270 | 0.4 | 3.5 | 0.95 |
| 3 | 20 | 45 | 35 | 90 | 0.2 | 5.0 | 0.75 |
| 2 | 15 | 50 | 35 | 350 | 0.7 | 2.0 | 0.75 |
| 3 | 15 | 50 | 35 | 90 | 0.4 | 10.0 | 0.9 |
| 1 | 20 | 40 | 40 | 130 | 1.4 | 3.5 | 0.8 |
| 3 | 20 | 40 | 40 | 90 | 0.2 | 5.0 | 0.85 |
| 1 | 20 | 35 | 45 | 110 | 0.4 | 3.1 | 0.8 |
| 3 | 20 | 35 | 45 | 80 | 0.2 | 4.8 | 0.85 |

EXAMPLE III

In Table V we see the effect in the zinc-manganese-iron ferrite system of using the covered receptacles as presintered core supports. The sintering process consisted of heating the green cores at 1270° C. for 30 minutes, furnace cooling to 1000° during a period of 10 minutes and metal plate quenching. The composition tested was $10ZnO, 50MnO, 40Fe_2O_3$ expressed in mol percents. Drive current pulses of one ampere were used.

*Table V*

| Method | Switching Time (μ sec.) |
|---|---|
| Open Boat | 240 [a,c] |
| Present Method | 210 [a,c] |
| Open Boat | 160 [b,c] |
| Present Method | 130 [b,c] |

*a*—Drive current of 1 amp.
*b*—Drive current of 1.5 amps.
*c*—Measured between 10% amplitude points.

EXAMPLE IV

Ferrites of the composition $12CdO, 33NiO, 55Fe_2O_3$, expressed in mol percents, were prepared by the two methods and their magnetic characteristics compared. Drive current pulses of 2 amperes were used. The sintering cycles were the same as described in the preceding example.

*Table VI*

| | Hc | Br/Bs |
|---|---|---|
| Open Boat | 3.2 | 0.85 |
| Present Metho | 2.3 | 0.95 |

EXAMPLE V

Ferrites of the composition $13.8ZnO, 20.7MnO, 27.6MgO, 37.9Fe_2O_3$ expressed in mol percents were prepared by the two methods and their magnetic characteristics compared.

*Table VII*

| Method | Switching Time (μ sec.) |
|---|---|
| Open Boat | [a, c] 1.92 |
| Present Method | [a, d] 1.84 |
| Open Boat | [b, e] 2.00 |
| Present Method | [b, f] 1.66 |

[a] The sintering process consisted of heating the presintered cores at 1300° C. for 30 minutes, furnace cooling during 37 minutes to 1000° C., and quenching to room temperature.
[b] The sintering process consisted of heating the presintered cores at 1300° C. for 45 minutes, furnace cooling during 37 minutes to 1000° C., and quenching to room temperature.
Drive current pulses of [c] 0.310 amps; [d] 0.277 amps; [e] 0.286 amps; [f] 0.263 amps.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A method of making square hysteresis loop ferrospinel compositions containing at least one metal oxide selected from the group consisting of CdO and ZnO which comprises the steps of enclosing ferrite core bodies in a receptacle resistant to high temperatures, placing an additional quantity of a powder having the same composition as that of the ferrite core body in said receptacle, fitting the receptacle with a cover consisting primarily of the same material as said receptacle, and sintering at 1000° to 1500° C. under a non-reducing atmosphere for 5 minutes to 3 hours to form, thereby, a ferrospinel having a chemically homogeneous distribution of ferrospinel magnetic material.

2. A method of making square hysteresis loop ferrospinel compositions containing at least one metal oxide selected from the group consisting of CdO and ZnO which comprises the steps of enclosing ferrite core bodies in a receptacle consisting primarily of platinum, placing an additional quantity of a powder having the same composition as that of the ferrite core body in said receptacle, fitting the receptacle with a cover consisting primarily of the same material as said receptacle, and sintering at 1000° to 1500° C. under a non-reducing atmosphere for 5 minutes to 3 hours to form, thereby, a ferrospinel having a chemically homogeneous distribution of ferrospinel magnetic material.

3. A method of making square hysteresis loop ferrospinel compositions containing at least one metal oxide selected from the group consisting of CdO and ZnO which comprises the steps of enclosing ferrite core bodies in a receptacle resistant to high temperatures, fitting the receptacle with a cover consisting primarily of the same material as said receptacle and sintering at 1000° to 1500° C. under a non-reducing atmosphere for 5 minutes to 3 hours to form, thereby, a ferrospinel having a chemically homogeneous distribution of ferrospinel magnetic material.

4. A method of making square hysteresis loop ferrospinel compositions containing at least one metal oxide selected from the group consisting of CdO and ZnO which comprises the steps of enclosing ferrite core bodies in a receptacle consisting primarily of platinum, fitting the receptacle with a cover consisting primarily of the same material as said receptacle and sintering at 1000° to 1500° C. under a non-reducing atmosphere for 5 minutes to 3 hours to form, thereby, a ferrospinel having a chemically homogeneous distribution of ferrospinel magnetic material.

References Cited in the file of this patent

UNITED STATES PATENTS

| | | |
|---|---|---|
| 2,565,861 | Leverenz et al. | Aug. 28, 1951 |
| 2,754,172 | Went et al. | July 10, 1956 |
| 2,770,523 | Toole | Nov. 13, 1956 |
| 2,842,500 | Gibson et al. | July 8, 1958 |
| 2,924,573 | Sasaki et al. | Feb. 9, 1960 |

FOREIGN PATENTS

| | | |
|---|---|---|
| 694,554 | Great Britain | July 22, 1953 |
| 696,250 | Great Britain | Aug. 26, 1953 |
| 734,243 | Great Britain | July 27, 1955 |

OTHER REFERENCES

Harvey et al.: RCA Review, vol. XI, pp. 338–362.

Laubengayer et al.: J. Amer. Chem. Soc., vol. 74, pp. 2362, 2363, May 5, 1952.